Aug. 13, 1968     O. E. WILLIAMS     3,397,258
PROCESS FOR EXTRUDING SPHERICAL EXPANDABLE PARTICLES
Filed Dec. 15, 1965
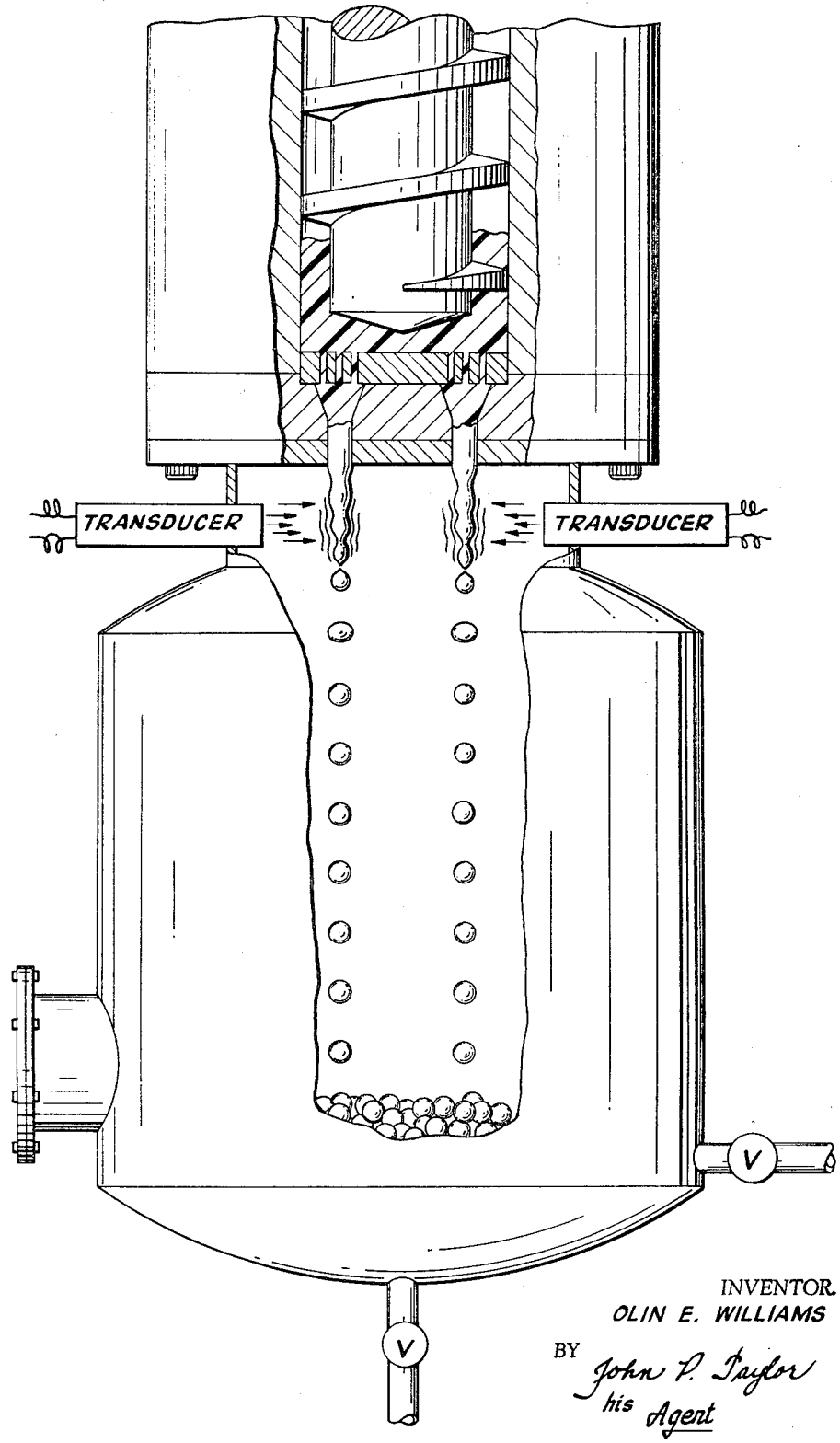
INVENTOR.
OLIN E. WILLIAMS
BY John P. Taylor
his Agent

United States Patent Office 3,397,258
Patented Aug. 13, 1968

3,397,258
PROCESS FOR EXTRUDING SPHERICAL
EXPANDABLE PARTICLES
Olin E. Williams, Pittsburgh, Pa., assignor to Sinclair-Koppers Company, a partnership
Filed Dec. 15, 1965, Ser. No. 513,990
2 Claims. (Cl. 264—9)

ABSTRACT OF THE DISCLOSURE

A process for forming spherical particles of expandable polystyrene polymer comprising extruding a fluid mixture of styrene polymer containing an expanding agent into a cooling liquid as a stream and subjecting the stream to a low-frequency vibration to break the stream into droplets. The droplets, while they are still in a fluid state, form spherical globules as they flow through the cooling liquid which eventually hardens these spherical globules.

---

This invention relates to expandable styrene polymers.

Expandable particles of styrene polymers are widely used to make a variety of foamed structures. Such foamed structures are used, for example, as ice buckets, as insulation, and in the manufacture of buoys, novelties, and the like. These expandable particles are generally of a styrene polymer having incorporated therein a suitable expanding agent or blowing agent. A typical expanding agent, for example, is a low-boiling hydrocarbon that boils below the softening point of the styrene polymer. A typical hydrocarbon is pentane.

A widely used particle of expandable polystyrene is sold under the trademark Dylite and is conveniently made in accordance with the process described in Patent No. 2,983,692. In this process the particles are suspended, as substantially spherical beads, in an aqueous media and impregnated by contact with the expanding agent. Consequently, the molders and users of expandable polystyrene particles have adapted their equipment to the use of spherical particles. However, the diameter of the beads formed by the suspension polymerization process must be kept within certain limits. Very small beads would result in an emulsion while attempting to polymerize very large bead sizes may result in a tacky condition wherein the beads tend to stick to one another.

Expandable particles of polystyrene can also be made by directly injecting the expanding agent into a molten mass of styrene polymer, extruding the polymer, and cooling the polymer suddenly and before the polymer, with the expanding agent therein, has an opportunity to expand. Such process is described in Patent No. 3,089,857. Since these particles are extruded as a strand, it has been necessary heretofore to cut the strands into convenient lengths. The particles resulting therefrom are of a general cylindrical or disc-like shape and are not suitable for use in much molding equipment, especially molds that produce thin-walled articles and are filled by blow-filling techniques.

This invention provides a novel process for extruding particles of expandable styrene polymer as spherical particles.

Briefly this invention comprises forming a mixture of styrene polymer and an expanding agent in a molten condition and flowing said composition as a stream into a bath of cooling liquid while subjecting said stream to low frequency oscillation.

It has been found in accordance with this invention that low frequency oscillation breaks the stream into particles which, as they flow through the cooling medium, form themselves into spheres while the composition is still fluid or plastic and then harden in the cooler portion of the cooling medium to spherical particles. Superatmospheric pressure is maintained on the cooling media to prevent the expansion of the blowing agent contained within the styrene polymer during the period that the styrene polymer is being extruded and that the so-extruded streams are being subjected to low-frequency oscillation and thus caused to separate and coalesce as individual beads.

An improved embodiment of this invention is the provision of a countercurrent flow of cooling liquid relative to the movement of the extruded streams. Coalesced beads come into contact with cooling liquid at its lowest temperature; extruded streams encounter warmer cooling liquid that permits freedom of response to low frequency oscillation. It has also been found that the rapid cooling of the particle in accordance with this invention tends to form a complete integral skin about the particle to thus make it more difficult for the expanding agent to escape from the particle thereby greatly enhancing the shelf-life of the particle.

The above and further objects and novel features of the invention will appear more fully from the following detailed description when the same is read in connection with the accompanying drawing which is not intended as a definition of the invention but is for the purpose of illustration only.

The drawing illustrates schematically apparatus for carrying out the invention.

Referring now to the drawing:

A latent-foaming styrene polymer composition is formed in this instance by feeding into an extruder polystyrene and, by heat and working, increasing the temperature of the polystyrene to between 200° F. and 450° F. whereby the polystyrene is brought to a molten condition. Thereafter, a volatile organic compound such, for example, as pentane which is not a substantial solvent for the polystyrene is fed into the extruder in a desired amount for admixture with the molten styrene polymer. The extruder itself and the manner in which mixing is accomplished affect markedly the usefulness of the expandable styrene polymers obtained. An effective extruder and process of mixing and extrusion is described and claimed in the copending application of Vesilind, Ser. No. 288,309, now U.S. Patent No. 3,287,477.

The resultant mixture is blended and propelled forward to the extruding die where the molten material is extruded as a stream into a liquid bath. As these streams are extruded into the liquid bath, they are subjected to a low-frequency vibration by way of a conventional oscillator. These oscillations break the stream into droplets and these droplets flow vertically downwardly through the cooling medium. The oscillation to which the extruded stream is subjected may be supplied, for example, by a transducer mounted to the side of the bath. The fluid media aids in transmitting the oscillations from the transducer to the molten stream. The particular frequency of the oscillations may be varied, but in the preferred embodiment the oscillator is selected to have a variable frequency output so that a range of frequencies may be selected from to obtain the resonance frequency of the molten extruded stream. The reason for this preference, of course, is that the vibrations transmitted to the stream, if at the resonant frequency of the stream, will be greatly amplified thus allowing for a maximum of vibrational energy being applied to the stream while minimizing the vibrations to which the adjoining equipment will be subjected. As these particles flow through the cooling medium, they form themselves into spheres while they are still plastic and then harden in the cooling medium until they reach substantially a room temperature at the bottom of the cooling medium. The particles are then removed as round or spherical particles.

The term "styrene polymers" as used herein is intended to include homopolymers of styrene and copolymers of styrene and other monomers copolymerizable with styrene.

The volatile organic compounds to be employed as the expanding agent in the process can be liquid or gaseous at ordinary temperatures and pressures. The expanding agent should be a non-solvent or a poor solvent for the polystyrene and should have a boiling point not substantially higher than the softening point of the polymer. Examples of such compounds are described in the aforesaid Patents Nos. 2,983,692 and 3,089,857 and include the butanes, pentanes, hexanes, heptanes, perchlorofluoro-hydrocarbons such as the Freons. The amount of expanding agent may vary from 2 to 15 parts per 100 parts of composition.

As is conventoinal in the art, small amounts of additives such as flameproofing agents, plasticizers, lubricants, dyes, light stabilizing agents and arsines, and the like may be added.

The resulting spherical granules can be readily handled in conventional process and equipment. In general, the particles are preexpanded in a Rodman preexpander such as described in Patent No. 3,023,175.

The particles may thus be expanded to the controlled bulk density as, for example, from ½ pound per cubic foot to 30 pounds per cubic foot. These particles are then placed in a mold that is closed but not air-tight and heated to a temperature above the vaporizing temperature of the expanding agent but below the melting point of the polymer. The process of forming the foamed structure is described in Koppers' Booklet, "Dylite-Expandable Polystyrene" 1954.

The foregoing has described a novel process for making expandable styrene polymers by the extrusion of a latent, expandable composition. The fluid extrudate is separated by vibrational energy and coalesced into spherical beads suitable for numerous molding applications where spherical beads are preferred.

I claim:

1. A process for forming spherical particles of expandable styrene polymer comprising: (a) extruding as a fluid stream a fluid mixture of styrene polymer containing an expanding agent into a cooling liquid; (b) subjecting said fluid stream to a low-frequency vibration transmitted to the fluid stream through said cooling liquid whereby the stream is broken into droplets; and (c) cooling said droplets in said cooling liquid at a rate such that the droplets form spherical globules while they are still plastic and then harden as they flow through the cooling liquid.

2. The process of claim 1 wherein the vibrational frequency to which said fluid stream is subjected is approximately the resonance frequency of the fluid stream.

References Cited

UNITED STATES PATENTS

| 3,026,272 | 3/1962 | Rubens et al. | 264—53 |
| 3,060,510 | 10/1962 | Fischer et al. | 264—9 |

FOREIGN PATENTS

| 908,089 | 10/1962 | Great Britain. |
| 813,146 | 5/1959 | Great Britain. |

ROBERT F. WHITE, *Primary Examiner.*

J. R. HALL, *Assistant Examiner.*